United States Patent [19]
Miller et al.

[11] 3,784,901
[45] Jan. 8, 1974

[54] CAPACITOR DISCHARGE IGNITION SYSTEM TESTING APPARATUS

[75] Inventors: Arnold W. Miller, New Berlin; William D. Larson, Jr., Franksville, both of Wis.

[73] Assignee: Electro-Specialties, Inc., New Berlin, Wis.

[22] Filed: Dec. 22, 1972

[21] Appl. No.: 210,842

[52] U.S. Cl. .............................. 324/16 R, 324/133
[51] Int. Cl. ........................................ G01m 15/00
[58] Field of Search ..................................................
324/15–17, 122, 133; 340/248 C; 73/116–119

[56] References Cited
UNITED STATES PATENTS
3,596,174   7/1971   Hovenga ............................. 324/17
3,633,195   1/1972   Menzel ............................ 340/248 C OTHER PUBLICATIONS
SCR Designer's Handbook Publ. by Westinghouse Electric Co. 1964, pages 7-59, 7-60.

Primary Examiner—Michael J. Lynch
Attorney—Andrus, Sceales, Starke & Sawall

[57] ABSTRACT

A potentiometer with leads interconnects to the conventional 12 volt battery. The potentiometer tap is connected to the capacitor charging terminals of a capacitor discharge ignition system with a meter for setting to a selected charging level. A test switch grounds connects the controlled rectifier gate for discharging of the capacitor through the ignition system pulse transformer. A relatively large dropping resistor in series with a low voltage selection potentiometer is connected to the transformer. A self-controlled rectifier has its gate connected to the selection potentiometer tap in series with a diode. An output circuit including a lamp and a low voltage battery responds to the selective triggering of the test rectifier.

8 Claims, 1 Drawing Figure

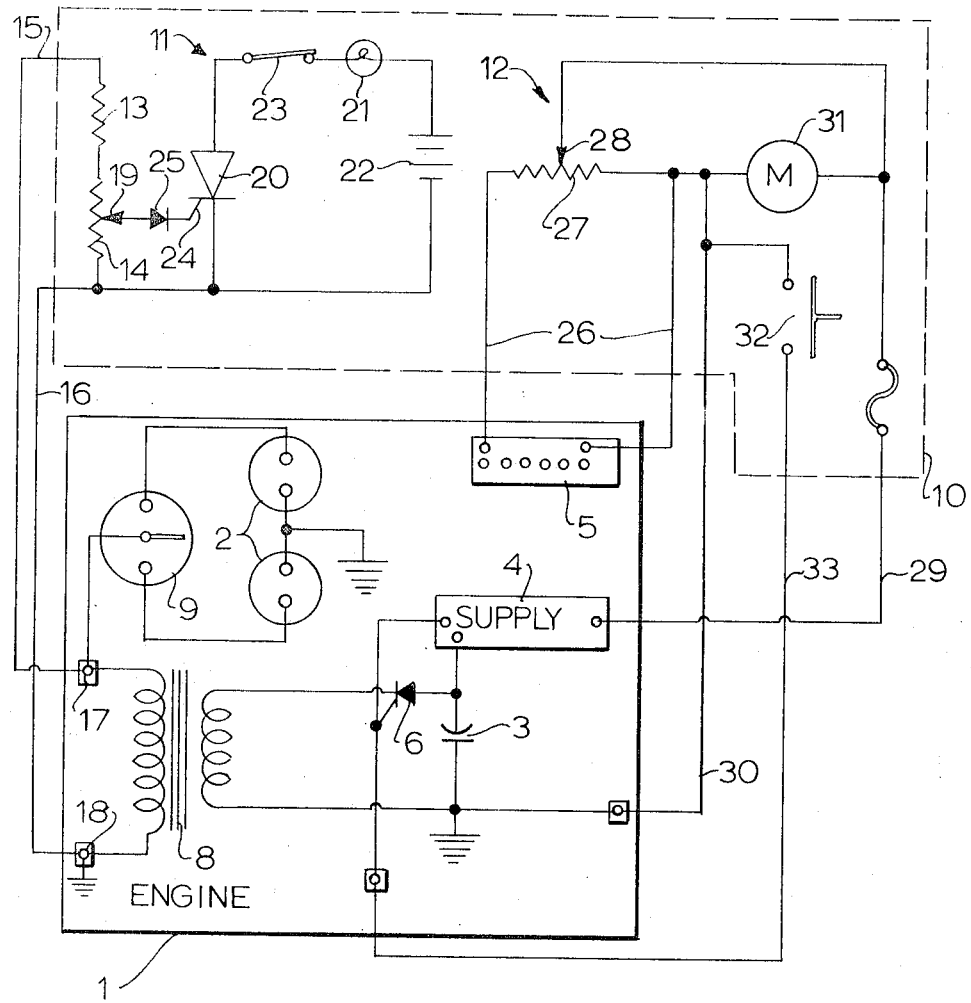

३,७८४,९०१

CAPACITOR DISCHARGE IGNITION SYSTEM TESTING APPARATUS

BACKGROUND OF THE INVENTION

Capacitor discharge ignition systems have been developed for improved ignition of internal combustion engines. Generally, a capacitor is connected to an alternator or a battery supply through a DC to DC converter and charged to a relatively high voltage level. Thus, for example, the capacitor may be charged to a level of 100 to 400 volts. The capacitor is also connected in a discharging or igniting circuit including a controlled rectifier or the like for discharging of the capacitor through a pulse transformer, the secondary of which is coupled to the spark plugs through a distributor or through separate parallel circuits. Capacitor discharge ignition systems have been found to greatly improve the ignition characteristics for internal combustion engines. However, they generally employ various electronic components and are advantageously potted, wholly or in part, for various practical reasons. The average engine ignition mechanic is not sufficiently knowledgeable in electronics to service and test the new CD ignition systems. There has not been readily available a simple and reliable means for determining whether or not the operating characteristics of the CD ignition unit is satisfactory.

SUMMARY OF THE PRESENT INVENTION

The present invention is particularly directed to a simple, portable testing apparatus permitting reliable determination of the output capability of the capacitor discharge ignition system. In accordance with the present invention, a small portable battery power supply, in combination with a discharge responsive gated switch means and an indicating means for discharging of a capacitor charged to a selected level into a control flow to determine whether or not the output pulse is of a nature to accurate fire the ignition system, preferably with the actuation of the low voltage indicator visually indicating the result. In particular, a resistive voltage dividing network is connected through interconnecting test leads across the secondary of the system pulse transformer. An adjustable signal means such as a tap in the network provides selection of a voltage which is connected to the gate of a gated switch such as a controlled rectifier. An indicator such as a lamp is connected in series with the gated switch means and a low voltage source such as a three volt dry cell battery. A normally closed switch provides for resetting of the indicating circuit. Applicants have found that this provides a simple, reliable and inexpensive detection circuit for testing whether the capacitor is charged to an adequate level from the supply to properly fire the engine.

The testor includes an adjustable charging supply having an adjustable voltage means such as a potentiometer with leads for connection to the battery supply employed with the internal combustion engine. The output of the potentiometer is connected as the input to the conventional DC to DC converter of the engine for supplying the charging energy to the capacitor. A meter provides regulation of the charging voltage to the desired level. In addition a push button control switch is connected via a lead to the gate of the main firing rectifier of the capacitor discharge ignition system to permit grounding of the gate and thereby firing of the controlled rectifier to discharge the capacitor through the pulse transformer and into the test indicating circuitry.

BRIEF DESCRIPTION OF THE DRAWING

The drawing furnished herewith illustrates the preferred constructions of the present invention in which the above advantages and features are clearly disclosed as well as others which will be clar from the following description of such embodiments.

The drawing shows a schematic circuit diagram illustrating a capacitive discharge ignition test device constructed in accordance with the invention.

DESCRIPTION OF ILLUSTRATED EMBODIMENT

Referring to the drawing, a two-cylinder internal combustion engine 1 is illustrated having a pair of spark plugs 2 for the respective cylinders, not shown. The engine 1 employs a capacitor discharge ignition system for alternate firing of the spark plugs 2 and in particular includes a capacitor 3 which is connected to a power supply 4 which is adapted to convert the conventional 12 volts of a battery to a relatively high voltage level for charging of the capacitor 3 to a desired voltage, for example, in the range of 100 to 300 volts. The capacitor 3 is connected into a discharge circuit including a controlled rectifier 6 having a gate connected to the power supply 4 for selective firing for transfer of energy to the spark plugs 2 through a transformer 8, the secondary of which is connected via a distributor 9 to the spark plugs 2.

The present invention is particularly directed to an ignition test apparatus 10 having a pulse output detection circuit or unit 11 connected across the secondary of the transformer 8 and a controlled charging supply circuit 12 to permit charging of the capacitor 3 to the desired or to a proper level.

In the illustrated embodiment of the invention the output pulse detection circuit 11 includes a fixed dropping resistor 13 in series with a relatively low resistance potentiometer 14. The series connected resistor 13 and potentiometer 14 are connected to a pair of test leads 15 and 16 which terminate in connectors for releasable connection to the output terminals 17 and 18 of the transformer secondary. The leads 15 and 16 are preferably a coaxial shielded cable to eliminate undesirable transient signals and may be provided with conventional connecting clips or the like to permit convenient connection to the terminals of the secondary. The pulse voltage is impressed directly across the voltage dividing network. The potentiometer 14 includes a tap 19 connected to control conduction through a gated switch such as a thyristor and shown as a controlled rectifier 20. An indicating lamp 21 is connected in series with a low voltage power supply 22 shown as a three volt dry cell battery across the main terminals of the controlled rectifier 20. When the rectifier 20 is fired to conduct, the lamp 21 will be energized. A reset switch 23 is connected in series with the lamp, battery and rectifier 20 to permit resetting of the rectifier 20 and the deenergization of the lamp 21 after the rectifier firing.

In particular, the potentiometer tap 19 is connected to the gate 24 of the rectifier 20. In the illustrated embodiment of the invention, a diode 25 is connected in series with the tap 19. The illustrated diode 25 is an optional connection which will stabilize the firing voltage level required for controlled rectifiers. Thus, control rectifiers depending upon manufacture and tolerances may have a gating voltage which will vary slightly with operating temperature and the like. Applicants have found that the controlled rectifier operation may be stabilized by the interconnection of the diode 25 in the gate lead. Alternatively, the controlled rectifiers 20 can be particularly selected to have a single repeatable gate voltage which will not vary from control rectifier to control rectifier or the like in which case the diode 25 can, of course, be eliminated.

The potentiometer is set to provide a gate voltage sufficient to drive the controlled rectifier 20 on only when the pulse output is of a magnitude sufficient to properly operate the engine.

The resistor 13 and potentiometer 14 are selected to have a resistance ratio of the order of 100 to 1. The setting of tap 19 of potentiometer 14 thus varies the voltage level applied to the gate in the range of 1 percent of the total ignition voltage such that a very sensitive voltage control is established which, in combination with the control rectifier, provides a means of accurately determining the operating characteristic of the capacitor discharge ignition system.

To ensure proper input to the unit, the controlled supply circuit 12 is provided with input leads 26 for connection to the 12 volt battery 6 or the like which is conventionally employed with internal combustion engines for automobiles, outboard marine equipment and the like. The circuit 12 includes a potentiometer 27 connected to leads 26 for connection to the positive and negative terminals of the battery. The potentiometer 27 further includes a tap 28 connected via a capacitor input test lead 29 connected to the DC to DC converter 5 for supplying the input to such supply. The return power path is made through a common ground lead 30 releasably interconnected to the ground terminal of the capacitor discharge ignition system. A meter 31 is formed as a part of the apparatus 10 and is connected across the leads 29 and 30 to provide a visual indication to the operator to permit accurate setting of the tap 28 to a desired level for determining a minimum effective input to the capacitor discharge ignition system.

In addition, the testing apparatus 10 includes a discharge control switch 32 shown as a push button switch, also connected via a control test lead 33 to the gate terminal of the control rectifier 6. When the switch 32 is closed, the gate is grounded to establish firing of the controlled rectifier 6 and discharging of the capacitor 3 through the pulse transformer 8. The energy is thus dissipated to cross the voltage dividing networks resistance elements 13 and 14, with a proportionate firing voltage applied to the low voltage controlled rectifier 20. If the firing pulse is of a sufficient energy level to properly operate the engine 1, the controlled rectifier 20 will be fired to conduct and energize the lamp 21. If the energy level is not sufficiently great to properly energize the engine, the controlled rectifier 20 will not conduct and the lamp 21 will remain deenergized. The potentiometer tap 19 may then be adjusted to light the lamp to indicate the operating level as the output is varied from 0 to 1 percent of maximum.

If the lamp 21 is energized the circuit is reset by momentarily opening the the switch 23 thereby breaking the holding current through the controlled rectifier 20 and requiring a subsequent pulsing through the gate 24.

In an actual construction of the present invention, the voltage dividing network included a fixed resistor 13 of 1,000 ohms and a 10 ohm potentiometer 14. The voltage dividing network was connected to a pair of three foot leads 15 – 16 terminating in clips for releasably connecting to the terminals 17 and 18. A coaxial shielded cable was employed for shielding purposes. The controlled rectifier 20, lamp 21 ans battery 22 were mounted and connected to a common ground plate, as shown by common line 34, along with the voltage dividing network. The diode 25 was eliminated by proper selection of the controlled rectifier 20 to provide a reliable firing voltage level. A three volt dry cell supplied power to a corresponding three volt lamp 21 in response to firing of the controlled rectifier. The charging supply included a 5 ohm 100 watt potentiometer 27 for supplying of the power to the capacitor discharge ignition system to permit operation from a conventional 12 volt automobile battery or the like. A 0 – 15 volt DC meter 31 was connected across the output of the potentiometer 27. The system has been found to provide a reliable testing apparatus for field testing of CD ignition systems.

Applicants have thus found that the present testing apparatus provides a simple, reliable and relatively inexpensive portable apparatus which can be employed to check the status of ignition systems in the field and the like.

Various modes of carrying out the invention are contemplated as being within the scope of the following claims, particularly pointing out and distinctly claiming the subject matter which is regarded as the invention.

We claim:

1. An internal combustion engine ignition testing apparatus for use with an internal combustion engine having a capacitor discharge ignition system with a capacitor selectively charged and discharged to establish a voltage pulse to an igniting means comprising an indicating means, a small protable battery power supply, a gated switch means having an input gate requiring a selected voltage input signal to fire the switch means and connected in a series circuit with the indicating means and the power supply, a resistive voltage dividing network including an adjustable signal connecting means and connected to apply a selected portion of the voltage across the network to said gate to thereby provide means to determine the energy level applied across the dividing network, a pair of connecting leads connected to said network and including releasable connecting means for connection to the output of the capacitor discharge ignition system whereby discharging of said capacitor establishes a corresponding pulse signal across the voltage dividing network corresponding to the voltage pulse supplied to the firing means, said signal means being adjusted to apply a proportionate part of said pulse signal to the gate of the controlled rectifier and thereby establishing a minimum firing pulse signal for actuation of the indicating means and providing a measure of the actual energy output value of the capacitor, said ignition system includes a gated switch means to discharge said capacitor and including a capacitor charging control circuit including an adjustable potentiometer having lead means for connection to a battery power supply and having a movable tap, a test lead connecting said tap to a releasable connector for connection as an input to the capacitor discharge ignition system, a meter connected across the potentiometer portion connected to the ignition system to provide visual indication of the adjusted voltage input to the capacitor discharge ignition system, a switch connected to the potentiometer, a control test lead connected to the switch and having a releasable connector for connection to a gate selectively firing of the gated switch means and discharging of the capacitor for supplying of the capacitor energy to said voltage dividing network.

2. The ignition testing apparatus of claim 1 wherein said gated switch means is a controlled rectifier having a control gate, and a diode connected in series between said control gate and said adjustable signal means.

3. The ignition testing apparatus of claim 1 wherein said battery power supply includes dry cell battery means.

4. The ignition testing apparatus of claim 1 wherein said resistive network includes a fixed resistor in series with a potentiometer having a variably positioned tap connected to said gate, said tap being adjusted to apply a proportionate part to said voltage to the controlled rectifier and thereby establishing the minimum firing pulse voltage for actuation of the indicating means.

5. The ignition testing apparatus of claim 4 wherein the fixed resistor and potentiometer having a resistance ratio of the order of 100 to 1.

6. The ignition testing apparatus of claim 1 wherein said battery power supply is a dry cell battery means of the order of three volts, said gated switch means is a controlled rectifier having said input gate, said resistive network includes a fixed resistor in series with a potentiometer having a variably positioned tap connected to said gate, said tap being adjusted to apply a proportionate part to said voltage to the controlled rectifier and thereby establishing a minimum firing pulse voltage for actuation of the indicating means, and a normally closed switch in series with the battery means and the controlled rectifier for resetting of the controlled rectifier.

7. The apparatus of claim 1 having a common grounded plate, wherein said resistor, potentiometer, grated switch means and power supply are mounted on said plate.

8. The apparatus of claim 1 wherein said pair of connecting leads is a coaxial shielded cable.

* * * * *